United States Patent

[11] 3,591,816

| [72] | Inventors | Moriyoshi Sakamoto<br>Yokohama-shi;<br>Yasuaki Kanda, Tokyo-to; Hiroyuki Kitamura, Yokohama-shi; Kenichi Hashizume, Yokohama-shi, all of, Japan |
|---|---|---|
| [21] | Appl. No. | 855,645 |
| [22] | Filed | Sept. 5, 1969 |
| [45] | Patented | July 6, 1971 |
| [73] | Assignee | Tokyo Shibuia Denki Kabushiki Kaisha Horikawa-cho, Japan |
| [32] | Priority | Sept. 9, 1968 |
| [33] | | Japan |
| [31] | | 43/64311, 43/64312, 43/64313, 43/77251, 43/77252 and 43/77253 |

[54] SYNCHRONOUS MACHINE PROVIDED WITH COMB-SHAPED MAGNETIC POLES
6 Claims, 7 Drawing Figs.

[52] U.S. Cl................................................ 310/58, 310/162, 310/263
[51] Int. Cl. ............................................. H02k 9/00
[50] Field of Search...................................... 310/54, 52, 58, 59, 62, 162, 163, 263; 181/33.4

[56] References Cited
UNITED STATES PATENTS

| 3,188,833 | 6/1965 | Robinson | 310/54 |
| 3,217,193 | 11/1965 | Rayner | 310/54 |
| 3,261,295 | 7/1966 | White | 310/54 |
| 3,271,606 | 9/1966 | Collins | 310/263 |
| 3,309,547 | 3/1967 | Woodward | 310/263 |
| 3,346,749 | 10/1967 | Shafranek | 310/263 |

*Primary Examiner*—Milton D. Hirshfield
*Assistant Examiner*—R. Skudy
*Attorneys*—Robert E. Burns and Emmanuel J. Lobato

ABSTRACT: A synchronous machine includes a stator with an exciting arrangement, a rotor having two interfitting, opposite magnetic pole yokes of comb-shaped configuration supported on two shafts. Each shaft is provided with cooling passages which operably communicate with the radial and longitudinal passages within the rotor. The rotor is also provided with nonmagnetic wedges which include axially disposed cooling holes connected with cooling passages within the rotor. Furthermore, synchronous machine is provided with a ventilating fan for circulating cooling air through the machine.

PATENTED JUL 6 1971

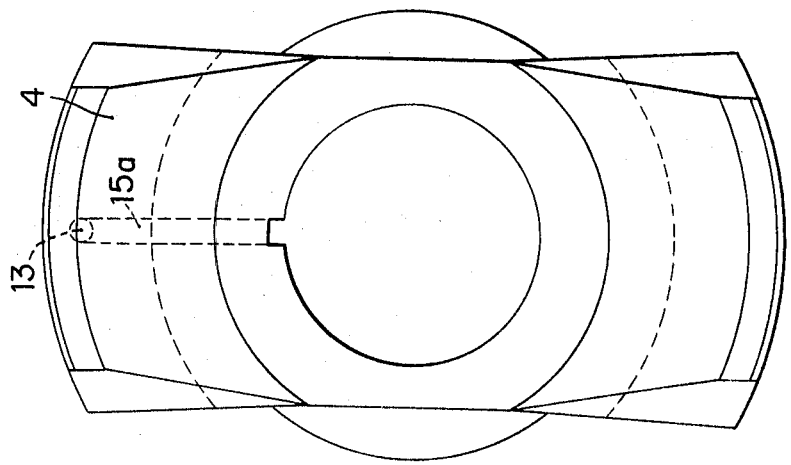
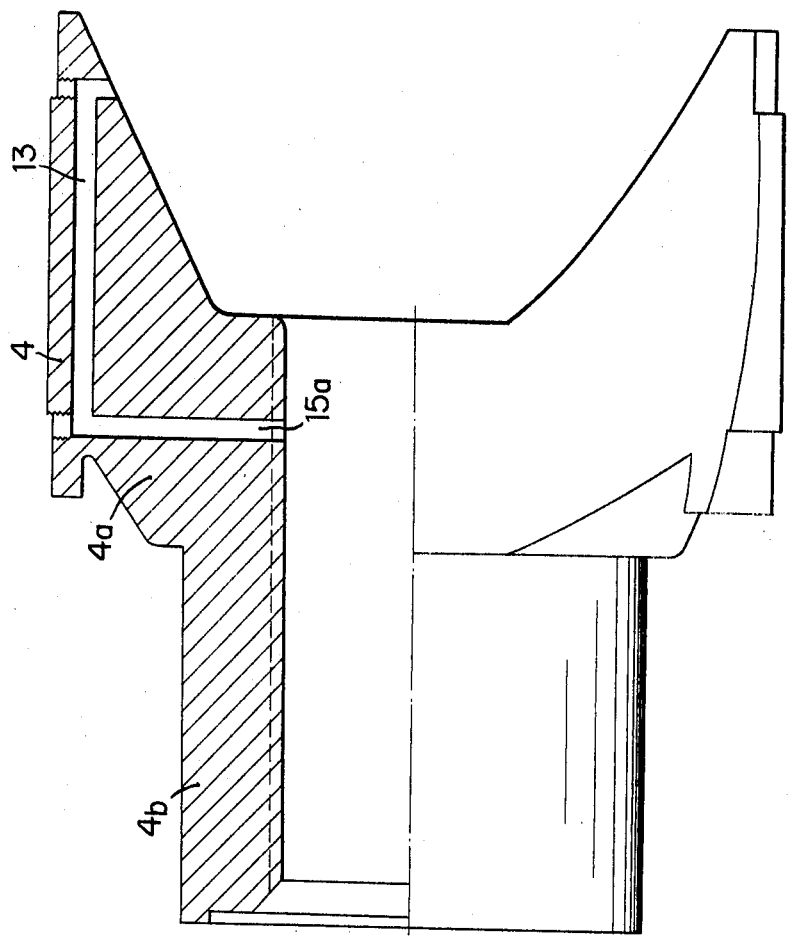

SYNCHRONOUS MACHINE PROVIDED WITH COMB-SHAPED MAGNETIC POLES

BACKGROUND OF THE INVENTION

The present invention relates to improvements in a synchronous machine provided with so-called comb-shaped magnetic poles, said machine comprising a stator armature, a rotor comprising comb-shaped cylindrical magnetic poles, and an exciting means.

The synchronous machine as mentioned above can be effectively utilized as a generator for charging the battery of an automobile, a driving motor for an electric automobile, a stepping motor for a numerical controlled machine tool and the like or as a DC brushless motor which comprises a thyristors connected to the armature winding thereof and an angular position detecting device located at the end of axle, functioning to control the on-off of said thyristors in a predetermined sequence responsive to angular position of the rotor of the motor.

In these applications, it is preferable to set the rotational speed of the synchronous machine very high, for instance, may be of about 20,000 r.p.m. in order to achieve reducing of the whole dimension thereof. The comb-shaped poles of the rotor is also usually made of solid iron to resist destructibility during its high speed operation, as a result, a large eddy current is produced on the surface of the magnetic poles. Thus, by taking such a design of small dimension and producing a large eddy current on the pole surfaces, a large quantity heat is produced, causing excessive temperature rise of the machine. Furthermore, in the synchronous machine as mentioned above, various leakage fluxes and hysteresis loss are liable to occur, whereby the temperature rise of the machine is further increased, thus causing decrease in efficiency, output, and performance of the machine.

The above-mentioned disadvantages of the synchronous machine have been effectively reduced by the structure according to the invention.

SUMMARY OF THE INVENTION

It is an essential object of the invention to provide an improved synchronous machine provided with comb-shaped magnetic poles, the cooling effect of said machine being made to be extremely high, without causing decreases in mechanical strength and magnetic characteristic, thereby to elevate efficiency, output and performance of the machine.

The above and other objects of the invention and characteristic features and function of the invention will be clearly understood by the following description taken in conjunction with the accompanying drawings, in which the same or equivalent members are designated by the same reference numerals.

BRIEF DESCRIPTION OF THE DRAWINGS

FIG. 2 is an elevational view, in partial vertical section, of a half part of the rotor of the example of FIG. 1;

FIG. 3 is a front view of the half part of the rotor, shown in FIG. 2;

DETAILED DESCRIPTION OF THE INVENTION

Figure 1:
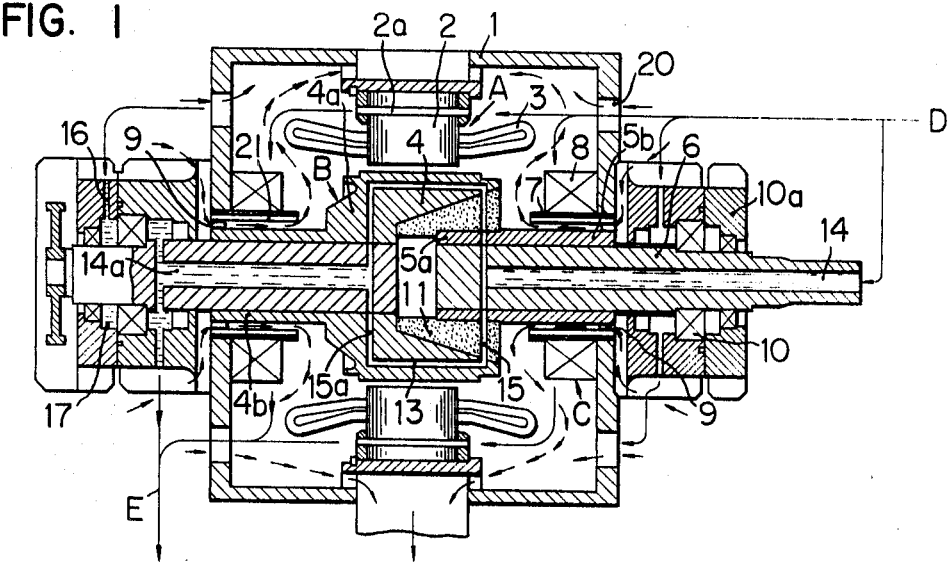
FIG. 1 is an elevational view, in vertical section, of an example of the invention.
Figure 4:
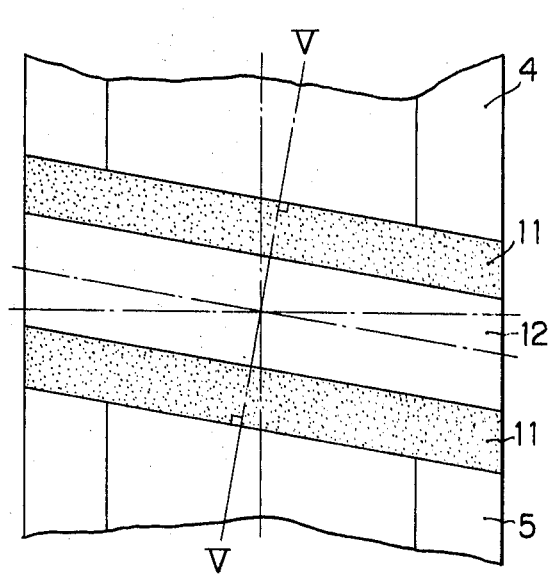
FIG. 4 is a plan view of the rotor of the example of FIG. 1.
Figure 5:
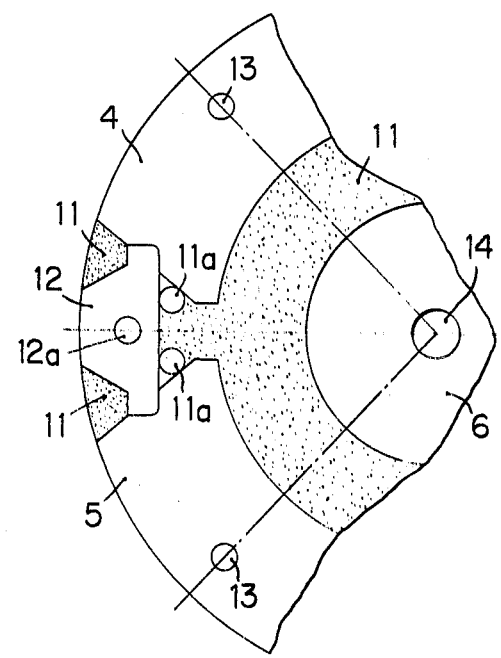
FIG. 5 is a sectional view along line V-V in FIG. 4.

Referring to FIGS. 1 to 3, the machine comprises a stator A, a rotor B, and an exciting means C. The stator A comprises an iron core 2 supported by a machine frame 1 and an armature winding 3 wound around said iron core, and the exciting means consists of an exciting winding 8 and a support member 7 supported by the machine frame 1 and supporting said exciting winding 8 thereon. The rotor B consists of two opposite magnetic pole yokes 4a and 5a, two cylinders 4b and 5b unified respectively with said yokes 4a and 5a and rotated by a rotary shaft 6 which in turn is supported by bearings 10, and cylindrical magnetic poles 4 and 5 supported respectively by said yokes, said magnetic poles 4 and 5 being engaged in spaced relation so as to form cylindrical comb-shaped magnetic poles, as shown partly in FIGS. 4 and 5. In this example, as clearly shown in FIGS. 2 and 3, the poles 4 and 5 are respectively two, so that the number of poles is totally four. The magnetic poles 4 and 5 are unified as one body by inserting wedges 12 between them and filling nonmagnetic filler material 11 in the space between said magnetic poles 4 and 5.

The stator iron core 2 is provided with a plurality of axial cooling holes 2a at the rear portions of the stator winding slots, and the rotary shaft 6 is provided at both sides with axial cooling holes 14 and 14a. The magnetic poles are provided with axial cooling holes 13, and the wedges 12 and filler material 11 are respectively provided with axial cooling holes 12a and 11a, said cooling holes 13, 12a and 11a being communicated at their two ends with said cooling holes 14 and 14a, respectively, by radial cooling passages 15a and 15 which are branched from the cooling holes 14a and 14, respectively. The bearing brackets 10a also may be provided with cooling holes 16 which are at their base ends communicated with the cooling holes 14 and 14 through spaces 17 one of which is merely shown in FIG. 1.

Figure 7:
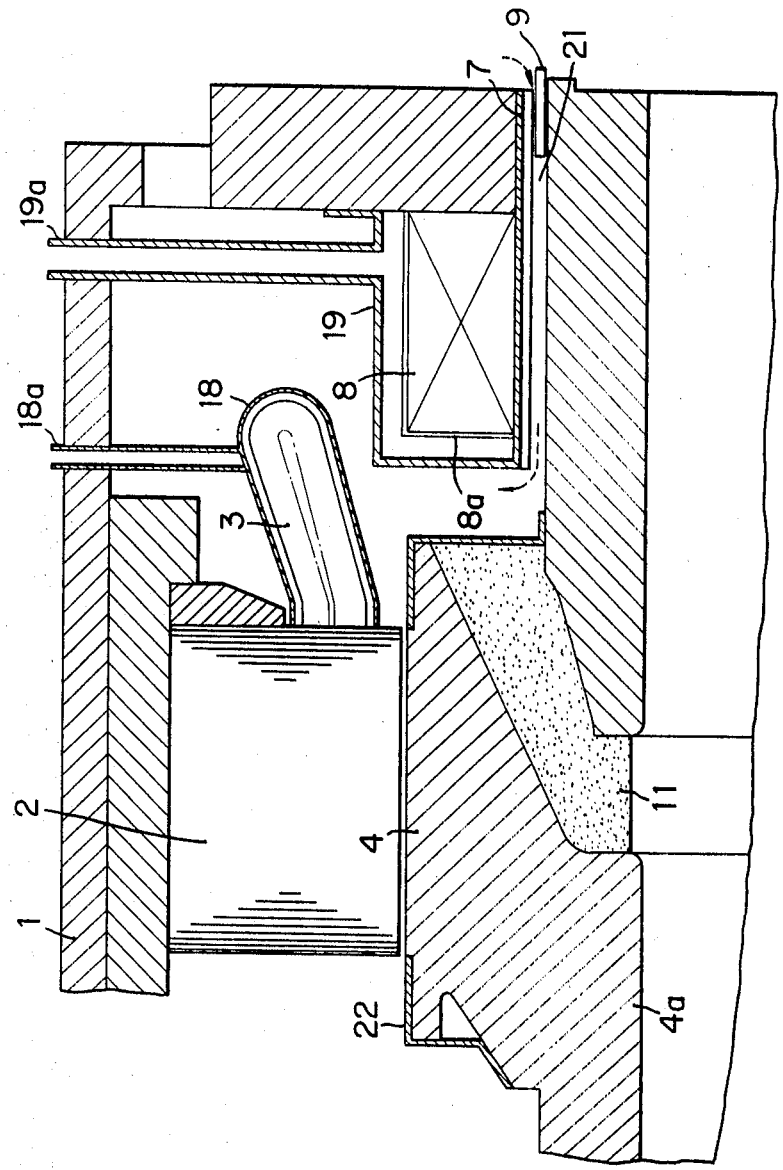
FIG. 7 is a sectional view for showing the manner in which the windings of the machine according to the invention are cooled.

In the synchronous machine as mentioned above, temperature rises of the armature winding 3 and the exciting winding 8 are usually high, so that if said windings are forcibly cooled by cooling fluid, said temperature rises and accordingly that of the machine can be further reduced. For this purpose, according to improvement of the invention, as shown in FIG. 7, the armature winding 3 is covered, at a gap therebetween, with a nonmagnetic and insulating layer (for instance, oil-resistive varnish layer) 18 and the exciting winding 8 is covered with the similar layer 19 as the layer 18 at a gap therebetween, and said gaps are communicated with cooling fluid circulating system by means of passages 18a and 19a, respectively.

Figure 6:
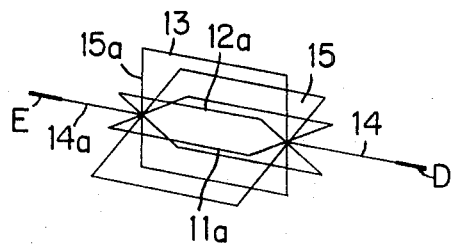
FIG. 6 is a schematic connection view for showing the cooling pipe system of the example of FIG. 1.

The above-mentioned various cooling holes are connected at their one side ends with cooling fluid supplying pipe D and at their other side ends with cooling fluid discharging pipe E of the cooling fluid circulating system which is shown by mere solid pipe lines in FIG. 1 and shown schematically in FIG. 6, whereby the cooling fluid is effectively circulated through the machine, thus causing effective cooling of various parts of the machine and increase in efficiency, output and performance of the machine.

Since the actual structure and attachment of the cooling fluid circulating means are conventionally well-known, said structure and attachment are omitted herewith.

In the machine as illustrated in FIG. 1, there is an apprehension that cooling fluid leaks from the joint portions between the magnetic poles 4, 5 and the nonmagnetic filler material 11. This disadvantage can be effectively eliminated according to the invention by shielding fluid-tightly said joint portions with nonmagnetic metal member 22 as shown in FIG. 7, said member 22 being attached, for instance, by welding.

Furthermore, if cooling air is circulated in the machine, cooling of the machine can be further improved. For this purpose, according to a further improvement of the invention, ventilating fans having blades 9 may be provided on the cylinders 4b and 5b, at the space formed in the support members 7 of the exciting winding 8 and ventilating holes 20, 21 are respectively provided at sidewalls of the machine frame 1, whereby cooling air as shown by dotted arrow in FIG. 1 is circulated through the machine.

As described above, according to the invention, very efficient synchronous machines provided with cylindrical comb-shaped magnetic poles can be obtained.

We claim:

1. A synchronous machine provided with comb-shaped cylindrical magnetic poles, and including a stator armature, a rotor, and exciting means, said stator armature comprising an iron core and an armature winding wound therearound, and said rotor comprising two opposite magnetic pole yokes, two cylinders supporting said yokes respectively, two shafts connected respectively to said cylinders for rotatably supporting said cylinders, and cylindrical magnetic poles supported respectively by said yokes, the magnetic poles supported by one yoke and those supported by the other yoke being disposed in an interfitting cylindrical comb-shape configuration:

an improvement comprising a combination wherein each of said shafts has an axial cooling hole disposed therethrough; said poles have cooling holes provided therein, said pole cooling holes being disposed in the axial direction near the radially outward surfaces thereof, and terminating inwardly of the axial extremities of said yokes; and said yokes, poles, and shafts have intercommunicating branched cooling passages disposed radially and in communication at their outer ends with the axial ends of said axial pole cooling holes, and in communication at their inner ends with said shaft holes, wherein said hole in one of said shafts comprises a supply passage for a cooling fluid which passes through said one shaft, through said yokes and poles, and through the other of said shafts which comprises a discharge passage for said cooling fluid.

2. A synchronous machine as set forth in claim 1, in which a nonmagnetic filler material and nonmagnetic wedges are inserted between said interfitting magnetic poles, and in which at least one of said nonmagnetic wedges and the nonmagnetic filler material are provided with axially disposed cooling holes connected to said branched cooling passages for circulating cooling fluid therethrough.

3. A synchronous machine as set forth in claim 2, further comprising nonmagnetic metal members disposed at the joint portions between the magnetic poles and the nonmagnetic filler material in the rotor for providing fluidtight seals at said joints, thereby protecting said joint portion from leakage of the cooling fluid.

4. A synchronous machine as set forth in claim 1, further comprising nonmagnetic covers having cooling passages therein, said covers being disposed around the armature winding and exciting means for receiving a cooling fluid through the passages of said covers.

5. A synchronous machine as set forth in claim 1, in which said stator iron core has axial cooling holes provided therein at portions radially outward of stator winding slots thereof.

6. A synchronous machine as set forth in claim 1, in which said stator is supported on stator side frames provided with cooling air passages, and further comprising ventilating fan means provided in-between said cylinders and stator side frames for drawing in and discharging cooling air, and to circulate cooling air through said cooling air passages.